(12) United States Patent
Alcalde Undurraga (10) Patent No.: US 12,344,153 B2
(45) Date of Patent: Jul. 1, 2025

(54) MOBILE STATION FOR CARRYING OUT AERIAL SPRAYING OPERATIONS BY MEANS OF UNMANNED AERIAL VEHICLES

(71) Applicant: TECNOLOGÍAS PASTOR SPA, Santiago (CL)

(72) Inventor: Rodrigo José Alcalde Undurraga, Santiago (CL)

(73) Assignee: TECNOLOGÍAS PASTOR SPA, Santiago (CL)

( * ) Notice: Subject to any disclaimer, the term of this patent is extended or adjusted under 35 U.S.C. 154(b) by 474 days.

(21) Appl. No.: 17/756,703

(22) PCT Filed: May 27, 2020

(86) PCT No.: PCT/CL2020/050057
§ 371 (c)(1),
(2) Date: May 31, 2022

(87) PCT Pub. No.: WO2021/102594
PCT Pub. Date: Jun. 3, 2021

(65) Prior Publication Data
US 2022/0410790 A1    Dec. 29, 2022

(30) Foreign Application Priority Data
Nov. 29, 2019   (CL) .................................. 3499-2019

(51) Int. Cl.
*B60P 3/11*     (2006.01)
*B60P 3/22*     (2006.01)
(Continued)

(52) U.S. Cl.
CPC . *B60P 3/11* (2013.01); *B60P 3/22* (2013.01); *B64F 1/364* (2013.01); *B64U 80/86* (2023.01);
(Continued)

(58) Field of Classification Search
CPC .. B60P 3/11; B64F 1/264; B64F 1/364; B64U 2010/00; B64U 2010/45; A01C 15/00; A01C 21/00; A01M 13/00
(Continued)

(56) References Cited

U.S. PATENT DOCUMENTS 3,399,794 A * 9/1968 Hummel ................. B60P 3/055
296/35.3
8,875,400 B2 * 11/2014 Ritts .................... B61D 17/046
29/897.31
(Continued)

FOREIGN PATENT DOCUMENTS

| CN | 207413328 U | * | 5/2018 |
| JP | 6558508 B1 | * | 8/2019 |
| KR | 20190043701 A | * | 4/2019 |

OTHER PUBLICATIONS

CN207413328 Text (Year: 2018).*
(Continued)

*Primary Examiner* — Dennis H Pedder
(74) *Attorney, Agent, or Firm* — K&L Gates LLP (57) ABSTRACT

Mobile station to carry out aerial spraying operations for large surfaces by means of drones which comprises at least one of a machine room comprising at least one electricity generator and an energy backup system; at least one compartment for the storage and transport of drones; a mixing tank connected to a water storage tank; a loading and unloading equipment movable on at least one rail; a lifting equipment arranged outside and configured to lift an operator; a battery charging and transport compartment for drones, a lighting system, a resting place incorporated into the system, multiple hermetic and washable containers for the transport of chemical products, dispensers, chemical
(Continued)

waste, personal protection elements, spill containment elements (sand, non-sparking shovels, swabs), clean clothes, dirty clothes, trash.

10 Claims, 7 Drawing Sheets

(51) Int. Cl.
| | | |
|---|---|---|
| | *B64F 1/36* | (2017.01) |
| | *B64U 80/86* | (2023.01) |
| | *B64U 50/37* | (2023.01) |
| | *B64U 101/00* | (2023.01) |
| | *B64U 101/45* | (2023.01) |

(52) U.S. Cl.
CPC .......... *B64U 50/37* (2023.01); *B64U 2101/00* (2023.01); *B64U 2101/45* (2023.01)

(58) Field of Classification Search
USPC .................................................. 296/24.3, 32
See application file for complete search history.

(56) References Cited

U.S. PATENT DOCUMENTS

| | | |
|---|---|---|
| 9,386,738 B2 | 7/2016 | Peterson et al. |
| 9,873,408 B2* | 1/2018 | Capizzo .................... G05D 1/12 |
| 2015/0123462 A1* | 5/2015 | Kamradt .................. B67D 7/02 |
| | | 141/192 |
| 2016/0307448 A1 | 10/2016 | Salnikov et al. |
| 2017/0225802 A1 | 8/2017 | Lussier et al. |
| 2019/0075706 A1 | 3/2019 | Cavender-Bares et al. |
| 2019/0322206 A1* | 10/2019 | Lamy ........................ B60P 3/11 |
| 2020/0144849 A1 | 5/2020 | Thomson et al. |
| 2021/0197983 A1* | 7/2021 | Wang ...................... B64F 1/222 |

OTHER PUBLICATIONS

JP6558508 Text (Year: 2019).*
KR20190043701 Text (Year: 2019).*
International Search Report for related International Application No. PCT/CL2020/050057; report dated Jun. 3, 2021 (3 pages).
Written Opinion for related International Application No. PCT/CL2020/050057; report dated Jun. 3, 2021 (14 pages).

* cited by examiner

MOBILE STATION FOR CARRYING OUT AERIAL SPRAYING OPERATIONS BY MEANS OF UNMANNED AERIAL VEHICLES

FIELD OF THE INVENTION

The present invention refers to the field of agricultural solutions, in particular to equipment assisting in the application of all types of agrochemicals such as biostimulants, fertilizers and/or pesticides such as insecticides, fungicides or herbicides in large areas, high density crops, rugged geographies, isolated locations and aerially using drones.

BACKGROUND OF THE INVENTION

The spraying operations of agrochemicals in agriculture involve a great challenge considering the large surfaces that the agricultural properties have and which often have restrictions such as abrupt geography, the physiological condition of the crop or the condition of the soil, which make complex its implementation for correct fumigation.

At the present time, these tasks are carried out typically in four ways. The first is land-based, where inputs are moved, for example by means of a tractor over the entire surface to be sprayed, a task that is carried out mechanically, for example by means of a tractor or four-wheel motorcycle with a sprayer machine. However, this form of application is not always feasible to be used either due to the obstacles in the ground, such as hill slopes, muddy areas, very dense, high or flooded crops or due to the state of development of the crop, wherein its use causes significant losses due to mechanical damage to the soil, the crop and/or fruits.

Furthermore, in most cases, there are drawbacks when there is no immediate availability of the necessary water resource to dilute the product to be applied, a requirement for the large majority of phytosanitary products where water is the transport vehicle of the product to be applied in the crop, as with insecticides, fungicides or herbicides and the great majority of biostimulants, which means that the tractor or machinery must leave the application site to be replenished and return continuously, this task involves great losses of efficiency in resources such as time, man hours, machine hours, etc., for the sole concept of transfer.

On the other hand, the manual filling and cleaning of the spray systems tanks existing currently, as well as the preparation of mixtures in situ in the field, in addition to being slow, involves high risks of spillage with the consequent exposure to intoxication of the operators and pollution to the environment.

A second method of application is manual spraying, by means of knapsack or broadcast pumps, which is very slow, expensive and inefficient, dependent on a large amount of labour and high exposure for applicators, not being a real option in many circumstances such as when large areas are required to apply or when crops are of great height.

A third method of application is aerial spraying by means of manned aerial vehicles, which is traditionally carried out by means of specialized light aircraft or helicopters that fly low over the application area and discharge the agrochemicals. Although this method is more efficient than land and manual spraying in terms of application speed, in addition to being feasible in complex terrain it has the disadvantage that due to the size of the buildings the application accuracy is low, being able to damage the crops and to contaminate the neighboring sectors of the area to apply, such as inhabited places, the neighboring crops or water resources and animals being therefore a harmful method for the health of people and the environment due to its high risk of drift. In addition, due to its speed, height and strength of the wind emanating from the blades, the loss of product by evaporation is greater than all other alternatives and its effectiveness is weak.

A fourth method of application is by spraying using unmanned aerial vehicles (UAVs), also known as drones. Although this technology has been used in agriculture since the 1980s, it has revolutionized the industry in recent years by incorporating automatic flight control systems which make the operation more functional and can be used in different conditions where other spraying alternatives have limitations.

Although flight control systems are more functional each day, when applying technology in the field, a series of needs arise which are essential to satisfy in order to execute the application. In addition, the application of agrochemicals through spraying drones has a series of limitations for its operation:

1.—Distance: Due to the maximum flight distance restrictions designated for drones with exclusive line-of-sight flight, as is the case with fumigation drones and by manufacturers' recommendations, the proximity between the pilot and the drone is necessary and therefore the execution of a series of tasks in the paddock itself, among others, preparation, dissolution, maintenance and distribution of the mixture. In addition, it is necessary to keep all the required protection elements within reach, as well as the necessary devices and the relevant receptacles for the different materials, in addition to the charging equipment of the different electronic devices and the energy to carry out these tasks in a mechanical and automated way.

2.—Crop height: Based on the application technique by means of spraying drones and the rule that governs it and the form of operation indicated by the manufacturers of drones for fumigation, the height of the crops is also a limitation for the technology by preventing direct vision of the pilot to the drone.

3.—Necessary and demanded basic elements: As in the paddock the dependencies are located at a greater distance, it is necessary to have all the required elements in order to condition the transfer time and to benefit efficiency, structures such as a resting place, table, chairs, bathroom, shower, airtight receptacles for clean clothes, water, soap, etc.

4.—Access to energy sources and Internet: In order to recharge the batteries of the drones and the different devices and the operation of all the devices necessary for the operation, access to an energy source is essential and being in the paddock it is not always possible to have such a resource. On the other hand, Internet access is essential for the operation of drones since it allows access to their software, being a requirement in most models of fumigation drones and which is generally a limitation due to the lack of coverage in rural areas.

In the search for alternatives and improvements to the methods already described and with the aim of maximizing the efficiency of application by means of drones, some solutions are proposed in the patent literature aimed at the use of unmanned aerial vehicles for the application of agrochemicals in agriculture.

For example, document DE 102017010319 A1 discloses an agricultural distribution station for the delivery and distribution of goods, comprising at least one rechargeable energy storage means, a position detection device, a control and/or regulation device, at the least one tank, at least one measuring device and at least one distributor that may consist of an aircraft.

Likewise, document US 2016/0307448 proposes an automated cultivation system and method in which one or more drones are used to carry out agricultural tasks. The system comprises a base station which in one embodiment may be a mobile platform mounted on one or more vehicles.

Other similar equipment and systems are disclosed in documents US 2016364989 and U.S. Pat. No. 8,511,606.

In general, the solutions proposed by the state of the art documents, although they allow improving certain aspects of the ground spraying methods they do not represent an economically viable alternative nor are they practical to use. For example, in terms of space, solar systems attached to the state-of-the-art drones would require an energy of at least 6 Kw to be able to deliver enough energy to power them electrically. However, to meet this requirement the size of such solar systems would not allow the flight of drones or the mobility of the system.

With regard to the aerostatic systems presented in the state of the art, the volume or dimension required to lift the necessary built-in spraying systems, in addition to the liquid to be applied, make it inapplicable and technically not feasible to use. In addition, they are not more profitable or effective than existing fumigation methods because they also involve the use of very sophisticated equipment and very complex operations for the automation of spraying tasks, operations that are very cost-intensive and require a very skilled labour.

A requirement for the applicability of the systems proposed by the state of the art and of any other fumigation system is to comply with all the sanitary and environmental requirements imposed by the different entities and agricultural management programs (good agricultural practices), both national and international, the compliance and registration for the future marketing and export of the fruit to the different markets, demands and/or requirements not taken into account in the design of the indicated developments, is an obligation and is necessary.

Also, for their operation they need to have ideal conditions continuously, such as availability of constant electricity and internet supply, on-site water resources, human requirements such as bathrooms and rest places, conditions that most of the time are not available in isolated areas where agriculture is developed and that consequently make its application or adaptation to different geographical areas unfeasible.

It is therefore the object of the present invention to overcome the drawbacks identified in the state of the art, providing a solution that allows the application of agrochemicals in a way that is safe, environmentally friendly, profitable, efficient, effective and independent of soil conditions, cultivation and location of the area.

It is another object of the present invention to provide a solution that does not depend on the conditions of the terrain or the state of development of the crops, avoiding losses due to mechanical damage to the soil, crops and fruits.

It is another object of the present invention to provide a solution applicable to large areas or very dense crops, increasing the efficiency of the spraying drones by directing the product accurately towards the target and obtaining a greater wetting capacity per hectare at a lower cost.

It is another object of the present invention to provide an energy and water self-sufficient mobile solution, whose design makes the use of drone technology for agricultural fumigations viable in circumstances where it is not technically feasible for state-of-the-art solutions.

It is another object of the present invention to provide a solution that minimizes the risks of spillage and exposure with the chemical product and the consequent risk of intoxication of operators and to avoid risk of environmental damage.

DESCRIPTION OF THE INVENTION

The present invention consists of a mobile station to carry out aerial spraying operations by means of drones, which comprises at least one of:
- a machine room comprising at least one electricity generator and an energy backup system;
- at least one compartment for the storage and transport of drones;
- a mixing tank connected to a water storage tank;
- a loading and unloading equipment movable on at least one rail;
- a lifting equipment arranged outside and configured to lift an operator;
- a compartment for charging and transporting batteries for drones.

The proposed mobile station is configured to move by land towards the area in which the spraying of agrochemicals will be carried out by drones allowing to store and transport all the necessary equipment, supplies and devices inside. In this way, the operation can be carried out completely autonomously and without requiring any external supplies to the station. The foregoing advantageously allows increasing the efficiency in fumigation or pesticide application work, allowing to reduce the use of human resources and making the operation of this application method more efficient and allowing the work in any area regardless conditions, geographic location and culture requirements.

The high efficiency granted by the present invention for the operation of the fumigation technique by means of unmanned aerial vehicles, makes the fumigation technology with drones a real alternative that is technically and economically applicable in conditions and crops where it was not before.

The fact that the mobile station has a chemical product mixer which can operate mechanically, electrically and digitally, also connected to a water storage tank allows not only to dispense with the water resource in the workplace but also increase the safety of the operators and save a lot of time, since it has elements contributing to a quick preparation, dosage, dissolution, distribution and maintenance of agrochemical mixtures, and to the cleaning thereof thus minimizing contact and exposure of operators to chemicals and drastically reducing the time spent on those duties.

Another advantage associated with the system and its mixing tank is that since the entire electrical system is in constant operation it can operate during the mobile station transfers, reducing work times in the field in functions such as dissolution of the mixture and energy load of devices. It also provides a fast system for filling and recharging drones remotely with the product to be applied avoiding a great loss of time due to the operator's transfer every time this common and continuous operation is required during the application.

The mobile station facilitates the operation of applying agrochemicals in the field by means of said drones. Advantageously, the lifting equipment for lifting operators arranged outside allows to comply with the safety standards recommended by the manufacturers and the current regulations that require the vision of the drone to line of sight allowing work to be carried out in places of difficult access with vegetation or obstacles that impede visibility and tall crops such as fruit plantations, etc., a solution that had not been contemplated in the existing ones in the state of the art.

It also prevents the operator from having to go up and down stairs to reach a platform at height with the drone's radio control avoiding any stumbling that can result in an involuntary movement of the drone's controls and cause accidents.

At the same time, it allows the design of larger aerial application polygons due to the visibility it gives to the operators who control the spray drones. This equipment is also designed to be used with high frequency at a rate of 5-10 times per hour, taking into consideration that each time the drone resupplies it must be checked and resupplied by the pilot.

The mobile station also operates with a remote system for activating the pump for filling the drone tanks with liquid from the mixer using a long-range retractable hose. This results in great time savings for operators by not having to go to the station to activate a pump, which due to its remoteness takes time to travel. This contributes to a great time saving as it is a frequent task 5-10 times per hour depending on the capabilities of the drone.

Also, the remote system for activating the filling pump increases the safety of the operators by avoiding contact with the chemical product thanks to the joint operation with flow control devices, preferably in the form of valves. In addition, by having the mixing tank with shut-off valves and directional valves the emptying is directed directly to the drone tanks avoiding contamination by spillage and percolation.

Once the product has been dissolved in the mixing tank, the mixture needs to be shaken before being deposited in the drone tanks to avoid phytotoxicity in the crop due to an excess concentration of the product to be applied. For this, it is necessary to activate agitators contained in the tank in each refuelling which is done by means of a remote mixer activation system. Thus, by means of this remote system the movement towards the mobile station to activate the agitators is avoided saving a large amount of time in movement as it is a frequent action during the work, 5-10 times per hour, depending on the capabilities of the drone.

Another advantage of the remote mixer activation system is that it avoids leaving the mixers in constant motion resulting in great energy savings, an important point since energy is an expensive and limited resource.

All the above factors directly and substantially affect the efficiency and effectiveness of drone fumigation technology.

It should be considered that the construction of the proposed mobile station contemplates the use of anticorrosive materials that provide cleanliness and safety. In addition, its containers have anti-spill compartments that also provide safety to the operators and the environment.

These and other advantages of the proposed invention can be appreciated from the representative figures thereof described below which teach preferred embodiments, therefore, they should not be considered as limiting the definition of the claimed matter.

DETAILED DESCRIPTION OF THE INVENTION

Figure 1:
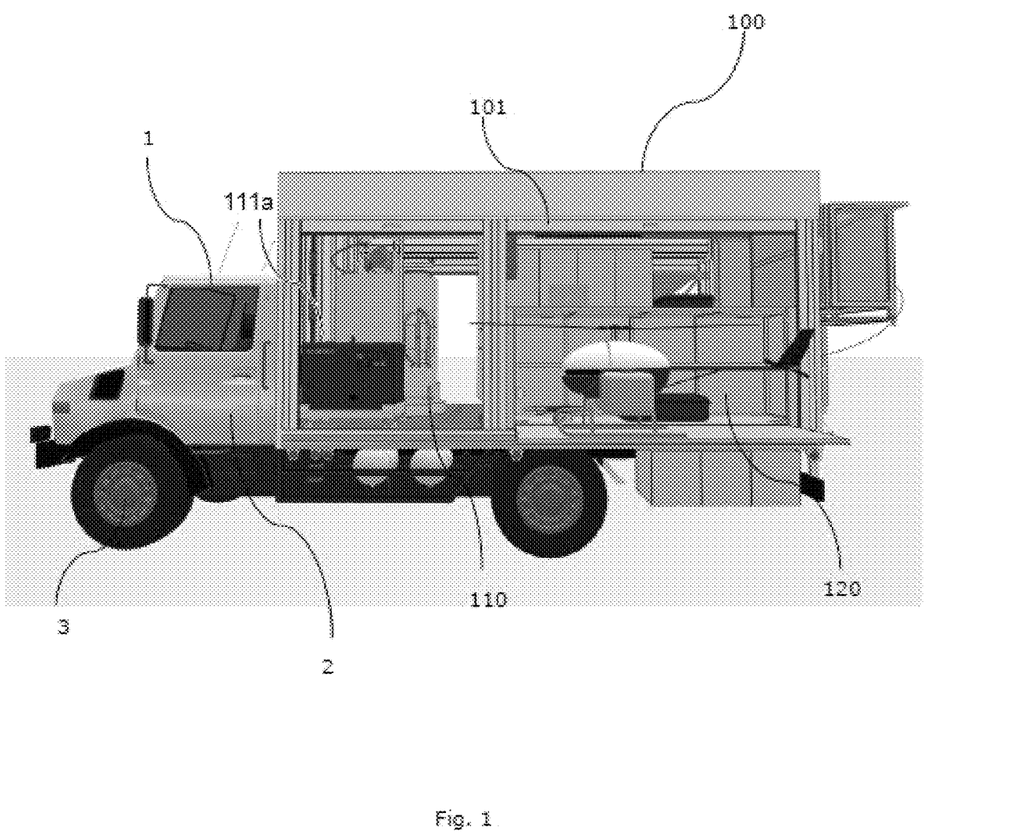
FIG. 1 shows a general view of the mobile station of the present invention.

According to the embodiment illustrated in FIG. 1, the mobile station 100 of the present invention is mounted on a motorized vehicle 1, preferably a 4×4 vehicle comprising a cabin 2 movable on wheels 3 and driven by an engine 4.

According to alternative embodiments of the invention, the mobile station 100 can be a trailer driven by a vehicle connected to it or it can even be self-propelled.

Continuing with FIG. 1, the mobile station comprises a machine room 110, preferably arranged at the front and at least one compartment for the storage and transport of drones 120. Preferably, the mobile station 100 has gates 101 on its sides, such as retractable metal curtains to protect its components during transportation and hermetic separations between the areas of preparation, dosage, dissolution, measurement and distribution of the agrochemical mixture and the part allocated to drones, energy load of devices, tools, work desk and security elements.

Figure 2:
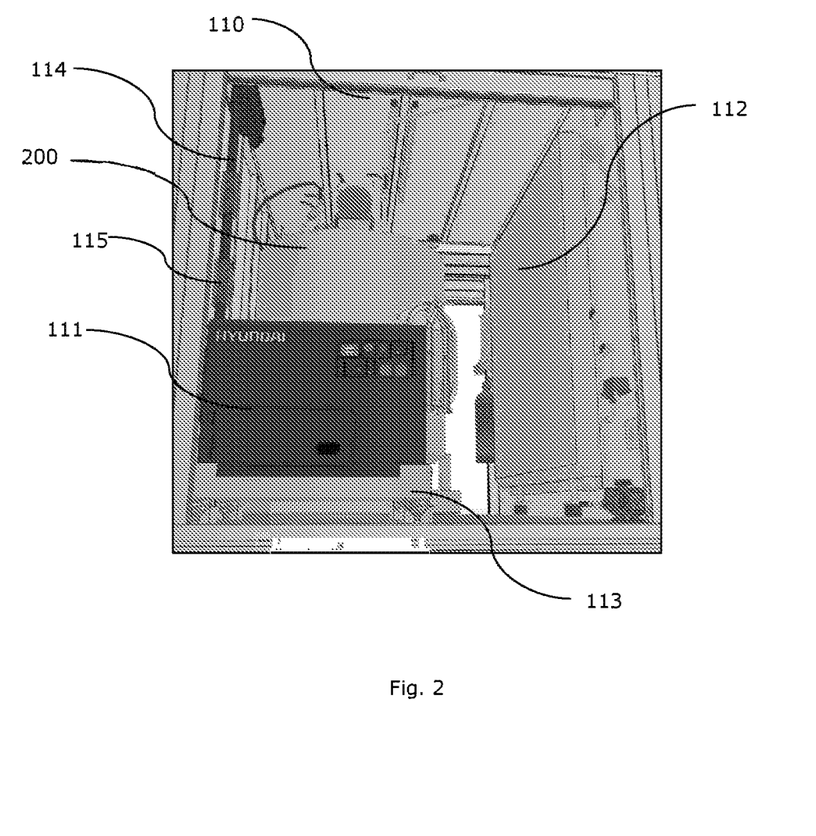
FIG. 2 shows the machine room of the mobile station of the present invention.

FIG. 2 shows in more detail the machine room 110 of the present invention which comprises at least one electricity generator 111, a mixing tank 200 and a water storage tank 112 with their independent systems for their use, measurement and distribution. According to a preferred embodiment, the machine room also comprises an airtight and washable container for the exclusive use of dosing elements, an airtight and washable container for transporting chemical products, both with anti-spill systems, lights, an extinguisher and a blackboard for mixtures and their prepared doses.

According to the illustrated embodiment, the electricity generator 111 consists of a diesel generator configured to supply current to the mobile station, as well as a charger inverter connected to a battery bank, said generator being mounted on a base with springs 113 to dissipate the vibrations generated by the electricity generator 111, thus allowing a correct and safe operation during transportation. In addition, the generator is connected to an exhaust pipe 114 that evacuates the gases out of the mobile station, said exhaust pipe may include silencers 115 to reduce the noise caused by the generator inside the mobile station contributing to safety of operators and keeping noise levels within safe standards for operators.

According to a preferred embodiment, the charger inverter together with the battery bank act as an energy backup system 111a that replaces the function of the electricity generator 111 in case of failures.

The water storage tank 112 preferably consists of a vertical stainless steel tank anchored by rubber supports to a wall of the mobile station and has, according to the illustrated embodiment, a quadrilateral shape that minimizes the use of space and the volume inside the mobile station.

Likewise, the mixing tank 200 is constructed from anticorrosive materials and has a preferably cylindrical shape. This is connected to the water storage tank 112 which supplies it with the water necessary to dissolve the agrochemicals according to the operation that will be described below.

Figure 3:
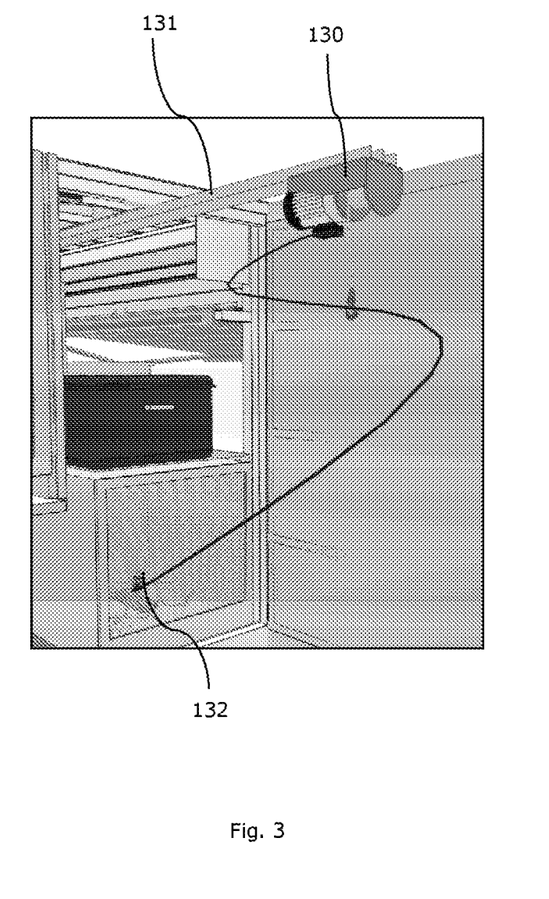
FIG. 3 shows the loading and unloading equipment of the mobile station of the present invention.

According to FIG. 3, the mobile station comprises loading and unloading equipment 130 movable on a rail 131 and electronically actuated by a button 132 for loading and unloading heavy equipment to and from the mobile station, such as drones, supplies, tools, etc., contributing to the safety of the operators and the efficiency of these common tasks.

Figure 4:
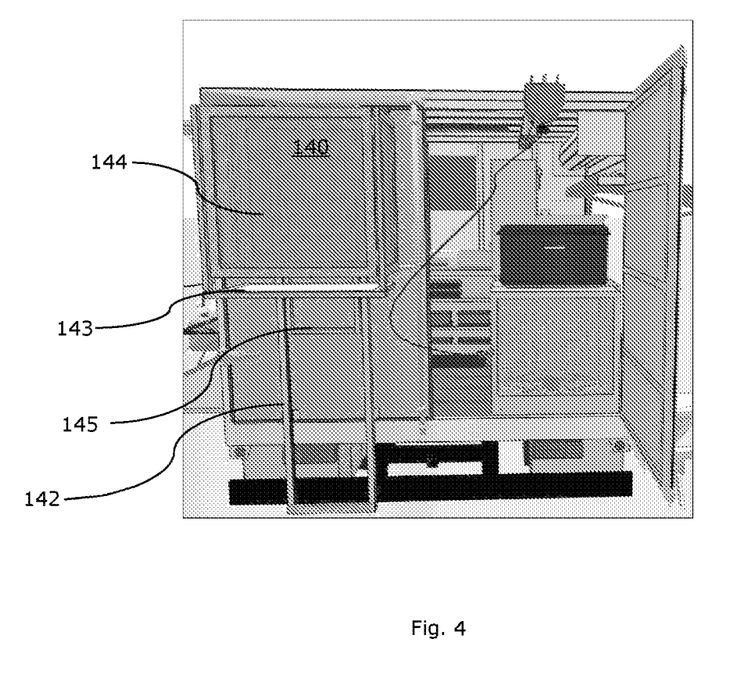
FIG. 4 shows the lifting equipment of the mobile station of the present invention.

As can be seen in FIG. 4, the mobile station comprises on its outer part a lifting equipment 140 configured to lift an operator so as to improve his vision during the operation of the drone or drones that carry out the spraying tasks. The lifting equipment 140 consists of a folding platform movable in the vertical direction through a vertical axis 142 by means of a motor and preferably comprising at least a base 143, a door 144 and a step 145. FIG. 4 shows the retractable platform in its folded condition. The lifting equipment 140 is preferably arranged at the rear of the mobile station.

Figure 5:
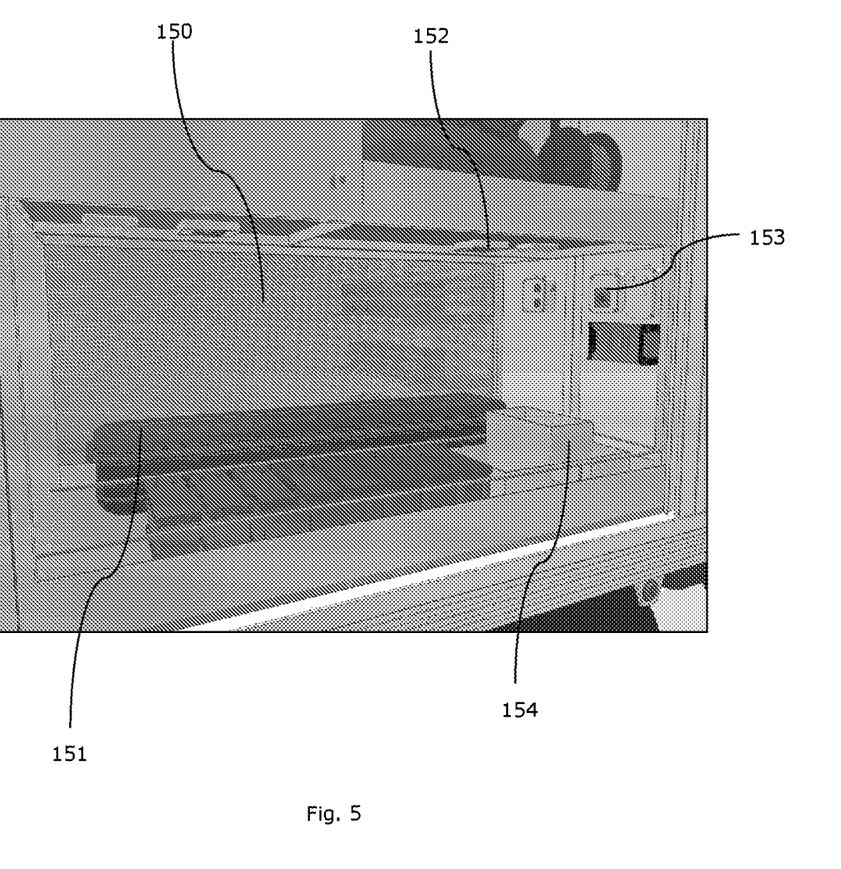
FIG. 5 shows the battery charging compartment of the mobile station of the present invention.
Figure 6:
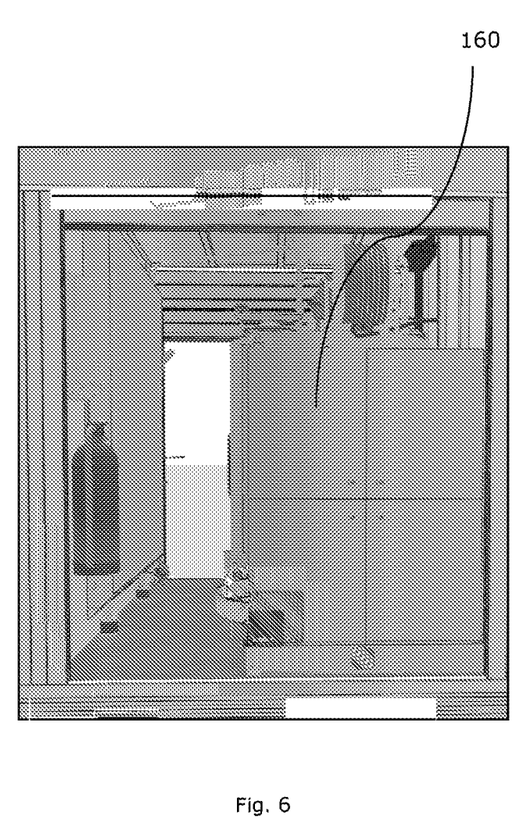
FIG. 6 shows the cabinet of supplies and tools of the mobile station of the present invention.
Figure 7:
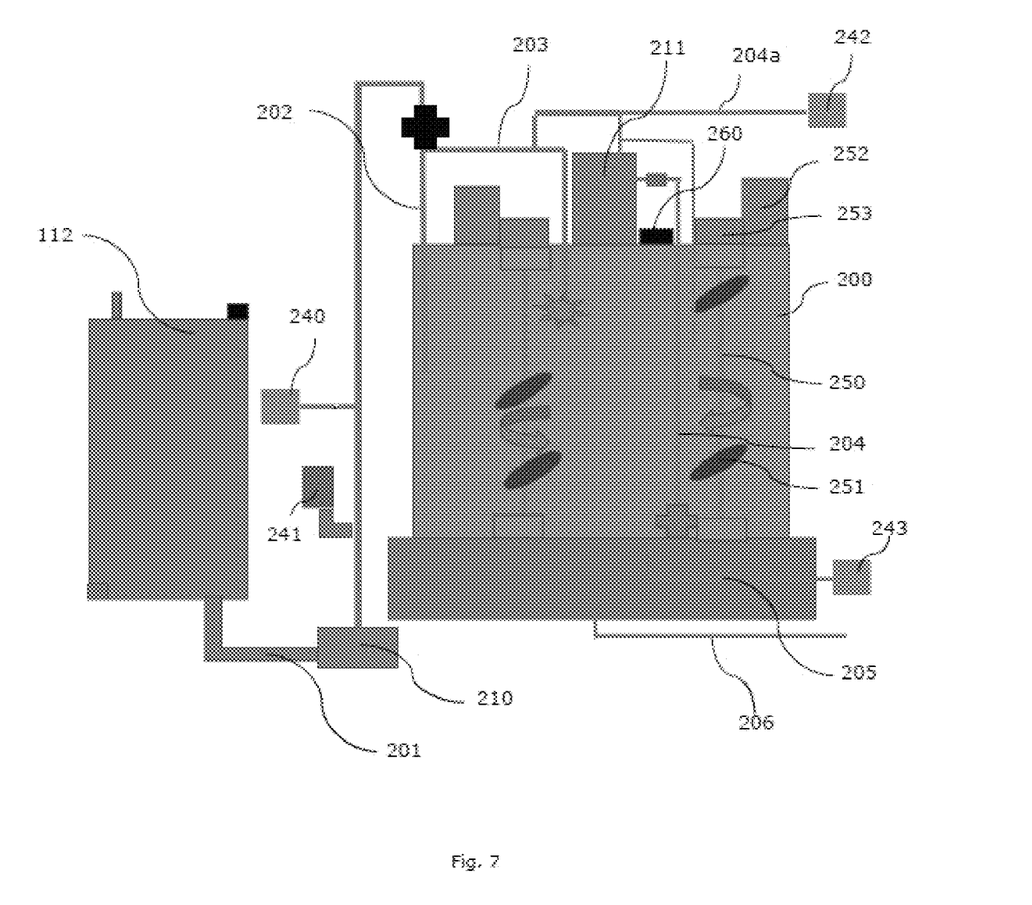
FIG. 7 shows a diagram of the mixing tank of the present invention.

According to FIG. 5, the mobile station comprises a battery charging compartment 150 configured to transport and charge the spare batteries and the total of the necessary and required devices by the drones in charge of carrying out the aerial spraying. According to the illustrated embodiment, the battery charging compartment 150 comprises a container for inputs 151 such as rechargeable batteries, cables, etc. It also comprises multiple sockets 152 to simultaneously charge several batteries and a current selector 153 to choose the selectable power supply source from, for example, the generator of the mobile station, the battery bank of the mobile station, external current to the mobile station or others. According to the illustrated embodiment, the battery charging compartment may comprise a charging pedestal 154 for arranging the batteries, tools and supplies that are used during the charging operation.

The battery charging compartment 150 also has a customized and electrically energized airtight plastic case whose function is to transport and charge during transfers a series of delicate devices such as radio control of drones, GPS, radio communicators, measuring instruments, among others.

Continuing with FIG. 6, the mobile station can have multiple cabinets 160 for the storage and transport of supplies and operating elements, such as personal protection items such as waterproof suits, glasses, gloves, masks, boots, sunscreen, first aid kit, helmet, chemical products, compressor, tools, software and hardware for measuring: wetting, flow, PH, wind speed, relative humidity and temperature. It can also comprise containers for fuel, water, detergent, folding tables, a chemical bath, attached shade curtain for the resting place, tools, spare parts, elements for containment of spills, etc., preferably constructed from washable and anticorrosive materials those that require/have anti-spill devices.

According to FIG. 7, an important component of the present invention is the mixing tank 200, which has a series of elements that help in the preparation, dosage, dissolution, and maintenance of chemical product mixtures, as well as to distribute them remotely to spray drones through mechanical, hydraulic and digital devices.

The mixing tank 200 is connected to the water storage tank 112 by means of a water supply pipe 201 connected to a first pump 210. From the first pump 210, water may flow into the tank through a water inlet pipe 202 or through a cleaning pipe 203, an operation that is selected manually by a valve 230. The cleaning pipe 203 flows out a pressure valve that cleans the walls of the mixer avoiding to be done manually by an operator. On the other hand, the water can be withdrawn directly from the water inlet pipe 202 by means of a first water outlet 240 regulated by a stopcock. The water that is driven by the first pump 210 is regulated by a pressure switch 241. Furthermore, the circuit includes check valves to prevent the transit of water from the mixer towards the water tank thus contributing to the safety of the operators and the system. It can also include a rapid priming system by manipulating different stopcocks, saving a lot of time in that daily operation.

Inside the mixing tank 200 there are preferably two rotary shafts 250 having stirring blades 251 configured to mix the liquid inside the tank. The rotation of each shaft is produced by a shaft motor 252 activated manually or remotely and connected to a reducer 253.

The liquid into the tank is extracted by a water extraction pipe 204 and by means of a second pump 211, activated manually or remotely, which evacuates the liquid towards a second water outlet 242 preferably connected to a retractable hose **204*a* and from there it is distributed to drones at a distance between 1 and 100 meters. Likewise, the liquid contained at the bottom of the tank can be extracted at the end of the operation for cleaning or in case of failure of the pump 211 by means of a third water outlet 243 through a first drain pipe 205**.

The mixing tank 200 also has a filling cap 260 for the entry of the chemical products into its interior and is mounted on an anti-spill container 260 that includes a second drain pipe 206 for the removal of the fluids accumulated inside. It also has a hermetic hatch in the vertical half of its structure to facilitate access to its interior either for cleaning or repair.

The mixing tank and water have liter meters that indicate their current content and with drain cocks in case of failure of the 210 pump.

The mobile station may comprise other security elements such as:

- Lights in the different compartments which allow working without daylight;
- Fire extinguishers;
- Access stairs;
- Washable, non-slip and insulating floor to provide safety to operators;
- Tell-tales that indicate motor and pump operation visible from any location;
- Remote control commands;
- Reflective stripes for visibility;
- Drain valves for anti-spill containers;
- Motors and pumps on and off switches;
- Vehicle GPS with vehicle locking capability;
- Tachograph;
- Reverse camera;
- Winch
- Hands-free system
- Chocks
- Wheel Chains In addition, to allow and facilitate the operation of spraying agrochemicals by drones, the mobile station may comprise:

- Multiple sockets to power different devices;
- Satellite Internet equipment for drone flight control system, computers;
- Hardware and software to control the wetting of the spraying drones in terms of number of impacts per square centimeter and size of the drops for the correct regulation of speed, application height, pump pressure, nozzles to be used in the drones depending on each crop and product to apply;
- Work desks and blackboards.

The invention claimed is:

1. A mobile station, fully functional, to carry out aerial spraying operations by means of drones, wherein it comprises at least one of:
    at least one compartment for the storage and transport of drones;
    at least one cabinet for the storage and transport of personal protective equipment;
    at least one container for the storage and transport of chemical products;
    at least one container for the storage and transport of spill containment elements;
    at least one mixing tank connected to a water storage tank, wherein the at least one mixing tank comprises at least two rotating shafts equipped with stirring blades, configured to mix liquid inside the tank, wherein the rotation of each shaft is driven by a shaft motor, and wherein the at least one mixing tank is mounted on a spill containment container;
    at least one remotely activated filling pump to fill tanks of the drones without direct operator intervention;
    at least one loading and unloading equipment movable on at least one rail;
    at least one lifting equipment configured to lift an operator, that allows line-of-sight visualization of the drones, optimizing operational safety;
    at least one selectable power supply source chosen from: an electricity generator, a backup energy system, an external power source to the mobile station;
    at least one battery charging and transport compartment for drones; and
    at least one retractable gate for component protection.

2. The mobile station according to claim 1, wherein the mixing tank comprises a water inlet pipe connected to a first pump which in turn is connected to a water supply pipe coming from the water storage tank.

3. The mobile station according to claim 2, wherein the water inlet pipe is connected to a first water outlet.

4. The mobile station according to claim 1, wherein the mixing tank comprises a water extraction pipe connected to a second pump, the latter being connected to a second outlet of water.

5. The mobile station according to claim 4, wherein the water extraction pipe is connected to a retractable hose configured to dispense the liquid to drones.

6. The mobile station according to claim 1, wherein it is mounted on a motorized vehicle.

7. The mobile station according to claim 1, wherein the water storage tank consists of a vertical tank anchored to a wall of the mobile station.

8. The mobile station according to claim 1, wherein the lifting equipment consists of a folding platform movable through a vertical axis.

9. The mobile station according to claim 1, wherein the battery charging compartment comprises multiple electric sockets and a current selector.

10. The mobile station according to claim 1, wherein the energy backup system comprises a charger inverter and a battery bank.

* * * * *